Figure 1:
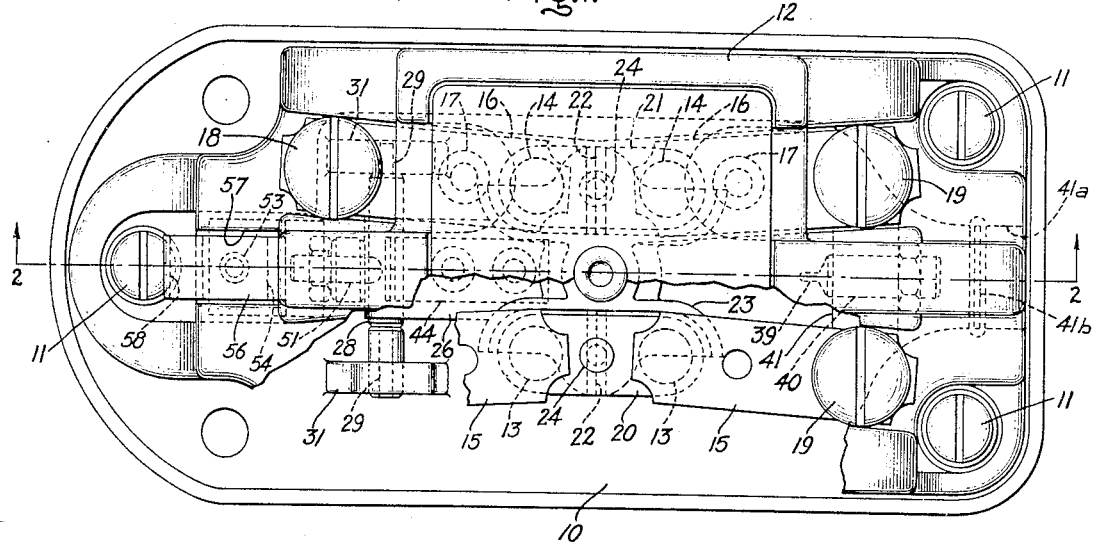

March 2 1943.  R. A. WINBORNE ET AL  2,312,948
THERMAL LIMIT SWITCH
Filed March 10, 1942

Inventors:
Russell A. Winborne,
Raymond L. Coultrip,
by Harry E. Dunham
Their Attorney.

Patented Mar. 2, 1943

2,312,948

UNITED STATES PATENT OFFICE 2,312,948

THERMAL LIMIT SWITCH

Russell A. Winborne, East Orange, N. J., and Raymond L. Coultrip, Waukegan, Ill., assignors to Edison General Electric Appliance Company, Inc., Chicago, Ill., a corporation of New York Application March 10, 1942, Serial No. 434,054

8 Claims. (Cl. 200—138)

This invention relates to an electric switch and more particularly to an over-temperature limit switch for protecting electrical heating equipment, such as an electric hot water heater.

While the new and improved over-temperature limit switch of this invention will be described in connection with its use as a protective device for an electric hot water heater, it is to be understood that it is not intended to limit this invention to such application since it may be readily applied to other types of electrically heated appliances.

In an electric hot water heater it is customary to provide one or more main control thermostats which operate to maintain the temperature of the liquid at a predetermined value. With such installations it is advisable to provide some form of over-temperature limit switch will act as a positive safety device to prevent over-heating in case of failure of the main thermostatic control system. To afford maximum protection, such an over-temperature limit switch should be constructed so that its calibration, i. e., the temperature at which the switch trips to the "off" or open circuit position, will not change over long periods of time. Moreover, the contacts should be constructed so that they will not be prematurely opened by vibration or jar so as to cause an unnecessary interruption of service.

In the case where the controlled electric heating device is a hot water heater, the over-temperature limit switch does not usually trip out unless some part of the control apparatus is operating improperly. To prevent possible damage it is desirable that the defect be corrected before the limit switch is reclosed and, to insure this, the limit switch should be constructed so that it may only be reclosed by an authorized person, who, in the usual case, is the representative of a service company.

An object of our invention is to provide an improved over-temperature limit switch which can be set accurately to open at a predetermined temperature and which will remain open until reclosed manually.

Another object is to provide a protective temperature responsive limit switch which can be closed only by an authorized person to insure that the defect in the controlled apparatus causing the opening of the switch will be remedied before the switch is reclosed and the controlled device reenergized.

A further object of the invention is to provide an over-temperature limit switch which maintains its calibration over long periods of time and which is simple in construction, rugged, and may be manufactured at a low cost.

A further object is to provide a limit switch having contacts which are operated at a predetermined temperature with a snap action but at lower tempertures remain firmly closed so that they will not be prematurely opened by vibration or jar.

A still further object is to provide an over-temperature limit switch constructed and arranged to respond rapidly to the temperature of the controlled device so as to afford maximum protection.

Further objects and advantages of our invention will become apparent as the following description proceeds and the features of novelty which characterize the invention will be pointed out with particularity in claims annexed to and forming a part of this specification.

Figure 2:
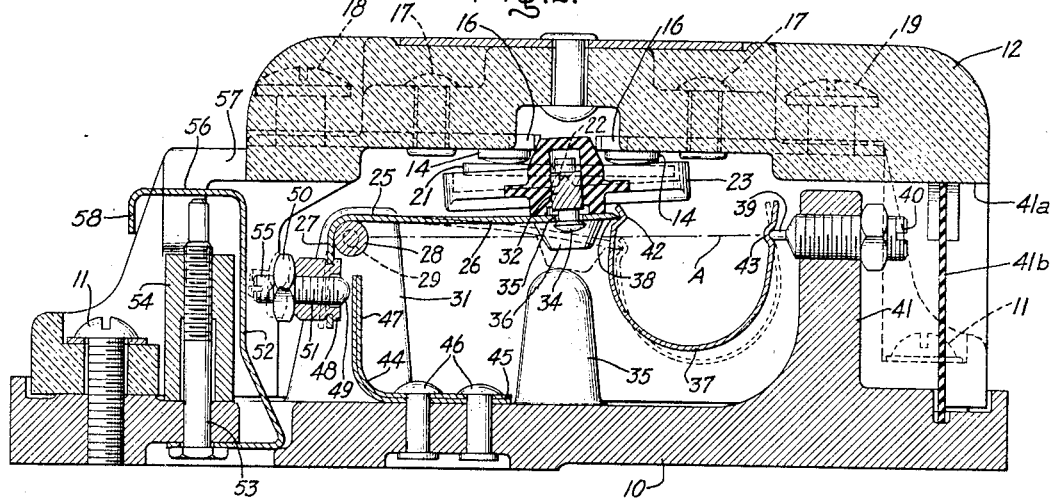

For a more complete understanding of this invention reference should be had to the accompanying drawing in which Fig. 1 is a plan view of the over-temperature limit switch forming the subject matter of this invention, partly broken away to show certain details of construction, and Fig. 2 is a sectional view of the device shown in Fig. 1 taken along the line 2—2 and looking in the direction of the arrows.

Referring to the drawing, our improved over-temperature limit switch comprises a base member 10 which is preferably formed of a suitable metal so as to be a good conductor of heat. Mounted upon the base 10 by screws 11 is a cover member 12 which is preferably formed of suitable insulating material, such as porcelain. The cover 12 cooperates with the base 10 to form an enclosing casing for the switch mechanism which will be described below. The control switch, which normally controls the energizing circuit of a controlled device such as an electric water heater, is the double pole type and comprises two pairs of stationary contacts 13 and 14 which are mounted on the ends of current conducting bars 15 and 16 which are in turn fastened to the cover member by means of rivets 17. The opposite ends of the current conducting bars 15 and 16 carry input and output terminals 18 and 19. The pairs of stationary contacts 13 and 14 are adapted to be connected by means of the movable bridging contact members 20 and 21. The bridging members 20 and 21 are rockably mounted on knife-edge abutments 22 extending upwardly from an insulating block or switch member 23 by means of drive screws 24 so that as the block 23 is moved upward to effect a closure of the switch the bridging members will automatically align themselves to give maximum contact pressure. The switch construction thus far described is entirely conventional and forms no part of the present invention.

In order to move the insulating block 23 up and down and thereby effect a closing and opening of the double pole control switch, we provide a novel temperature responsive switch actuating mechanism which will now be described in detail. Mounted for pivotal movement on the base 10 is a substantially L-shaped switch operating member 25 comprising a horizontally extending resilient switch arm 26 and a downwardly extending actuating arm 27. In the preferred illustrated form of the invention the L-shaped operating member 25 is formed by bending a strip of metal in the form of an L. The L-shaped member 25 is formed of flexible material so that the horizontally extending switch arm 26 has considerable resilience for a purpose which will be described below. The right angle portion of the member 25 is secured to a cylindrical pivot member 28 preferably by welding. Pivot member 28 has cylindrical end portions 29 of reduced diameter forming journals which are rotatably supported in spaced relation with the base 10 by means of the upstanding supporting members 31. The member 25 is therefore free to pivot about a horizontal axis extending transversely to the longitudinal axis of the base 10, the resilient switch arm 26 and the actuating arm 27 extending substantially radially from the pivot point.

The bridging contact carrying block 23 is loosely mounted upon the end of the switch arm 26 by means of a drive screw 32 which is mounted in the block 23 and has an end portion 34 which extends downwardly through a hole 35 adjacent the free end of the switch arm 26. The end of the screw 32 is headed to prevent the block 23 from becoming disconnected from the switch arm. The loose mounting gives a free floating action and prevents any binding action in operation of the switch. It will be apparent that as the member 25 is rotated counterclockwise, as viewed in Fig. 2, the block 23 will be moved upwardly and the switch will be closed. Similarly, if the member 25 is rotated clockwise the block 23 will be moved downwardly and the switch will be opened. The upward movement of the block 23 is limited by engagement of the bridging contact members 20 and 21 with the stationary contacts 13 and 14. In order to limit the downward opening movement of the block 23 there is provided a fixed abutment 35 extending upwardly from the base 10, the upper portion of which is adapted to engage a projection 36 extending downwardly from the block 23, as indicated by the dotted lines shown in Fig. 2.

In order to bias the movable switch member or block 23 firmly in both the open and the closed circuit positions and also to cause the switch member to move between the open and closed circuit positions with a snap action, we provide an over-center U-shaped resilient spring member 37. The two leg portions of the U-spring 37 extend between a knife-edge bearing 38 formed on the free end of the switch arm 26 and a rounded fixed bearing member 39 which is adjustably supported by means of a temperature adjusting screw 40 threadedly received in an opening in an upstanding projection 41. The screw 40 is accessible for adjustment of the temperature at which the switch trips to the open circuit position from the exterior of the casing through an aperture 41a in the cover which is normally closed by a suitable cover member 41b. The bearing members 38 and 39 are received in bearing seats 42 and 43 formed by providing suitable indentations in the end portions of the legs of the U-spring 37. When the member 25 is positioned so that the bearing member 38 is above a center line A determined by a line passing through the center of rotation of the member 25 and the fixed bearing 39, the U-spring 37 exerts upon the switch arm 26 a force having a vertically upward component forcing the switch member 23 to the closed circuit position. When the switch arm 26 is moved downwardly so that the bearing 38 is below the center line A, the U-spring 37 exerts a force on the switch arm 26 having a downward vertical component forcing the switch member 23 downwardly until the projection 36 engages the stop 35. It is therefore apparent that the U-spring 37 acts to bias the switch member 23 in both the open and closed circuit positions.

In order to cause the lever 25 to rotate in a clockwise direction and thereby cause an opening movement of the switch at a predetermined temperature, we provide an L-shaped bimetallic element 44 having a base portion 45 secured to the base 10 in good thermal relation therewith by means of rivets 46. The bimetallic element 44 has a freely movable portion 47 projecting outwardly from the base and lying in juxtaposition with the actuating arm 27 of the lever 25. The bimetallic element 44 may be formed in the usual way by welding together two strips of metal having different coefficients of expansion, such as Invar and nickel chrome steel. The bimetallic element is arranged so that the free end 47 thereof deflects to the left in response to an increase in temperature.

Interposed between the actuating arm 27 and the free end 47 of the bimetallic element is a preliminary temperature adjusting means comprising a screw 51 carried in a threaded bushing 48 which is mounted on the arm 27. The screw has a rounded end portion 49 which is adapted to be engaged by the free end of the bimetallic element. It will be apparent that by screwing the screw 51 in and out of the bushing 48 the temperature at which the bimetallic element engages the end portion 49 and rotates the lever 25 may be adjusted. A lock nut 50 is provided for maintaining the screw in the adjusted position. The preliminary temperature adjustment obtained by turning the screw 51 is set at the factory and temperature adjustments after installation are obtained by turning screw 40. This arrangement has the advantage that final adjustment of the temperature does not impose a strain on the operating parts.

The base member 10 is adapted to be mounted in thermal contact with the electric heating device that is being controlled. Thus, in the case where the limit switch is used as a protective device for an electrically heated hot water tank, the base 10 is mounted on the wall of the tank in thermal contact therewith. The temperature of the base therefore follows closely the temperature of the heated fluid, and heat conducted through the base flows directly to the bimetallic element 44 since the base portion 45 has substantial area in contact with the base 10. Therefore, it will be seen that the temperature of the bimetallic element follows closely the temperature of the device being controlled and the free end 47 of the bimetallic element deflects accordingly with a relatively small time lag.

For the purpose of reclosing the switch there is provided a resilient reset arm 52, one end of which is fastened to the base 10 by means of a screw 53 and a nut 54. The reset arm 52 extends upwardly from the base and has an intermediate portion which lies adjacent the outer end 55 of the temperature-adjusting screw 51 carried on the actuating arm 27. The reset arm has a reversely bent end portion 56 which extends outwardly through a slot 57 formed in the cover member 12 so that the outer end portion 58 of the reset arm forms a manually depressible operator. When the operator is pushed to the right, as viewed in Fig. 2, the reset arm engages the end portion 55 of the screw 51 whereby the lever 25 is rotated in a counterclockwise direction and the switch is reclosed. The bolt 53 extends upwardly beyond the nut 54 so that it acts as a stop limiting the inward resetting movement of the operator. This arrangement prevents over-stressing of the bimetal during the resetting operation. Since the reset arm is substantially enclosed within the switch casing and differs from the conventional push button resetting device, the resetting operation is not apparent to persons unfamiliar with the switch. The resetting operation is therefore effectively limited to an authorized person who would, of course, be familiar with the switch construction. This arrangement therefore insures that any defect in the controlled apparatus which may have caused an opening of the switch will be remedied by a properly authorized person before the switch is reclosed and the controlled device re-energized.

In operation the switch is normally closed so that current is conducted to the controlled electric heating device. At normal operating temperatures the free end of the bimetallic element 44 remains in spaced relation with or lightly touches the rounded end 49 of the screw 51.

If for some reason the temperature of the controlled device rises to a predetermined temperature for which the limit switch is set, the free end 47 of the bimetallic element deflects to the left and engages the screw 51, causing a clockwise rotation of the member 25. The deflection of the bimetallic element and consequently the clockwise rotation of the member 25 is necessarily rather slow due to the inherent operating characteristic of the bimetallic element. During the initial rotative movement of the lever 25 the block 23 remains forced in its uppermost or switch closing position by the action of the U-spring 37 due to the fact that the resilient switch arm 26 bends and in so bending stores the energy imparted to the rotating system by the bimetallic element. As the bimetallic element continues to deflect, a point is reached where sufficient energy is stored in the resilient switch arm 26 to overcome the upward force exerted on the free end thereof by the U-spring 37 and the arm moves downwardly. As the free end of the switch arm descends, the vertically upward force exerted thereon by the U-spring diminishes rapidly with the result that the switch member 23 is accelerated and moves rapidly to the open contact position indicated by the dotted lines. Thus, even though the bimetallic element moves slowly the contacts are opened very rapidly at a predetermined temperature, this action being desirable since it avoids arcing at the contacts.

The switch remains open until reclosed manually and as pointed out above, the manual reclosing operation is accomplished by depressing the operator 58.

It is important to note that several advantages result from the use of an L-shaped switch operating member and an L-shaped bimetallic element. Thus, with this construction it is possible to build a compact switch arrangement in which the free end 47 of the bimetallic element engages the screw 51 on the arm 27 at a point relatively close to the pivotal point of the lever 25. Because of this arrangement there is but a very small amount of slippage between these two elements during operation of the switch, which action is especially desirable since it results in more consistent operation of the switch. Another factor tending to give consistent operation so that the calibration of the switch does not change is the fact that the operating mechanism is not subjected to high mechanical stress. Thus, the bimetallic element, being freely movable at normal temperatures, is not stressed by any operative connection with the remainder of the switch operating mechanism. Also, the stress imposed on the member 25 is small, being only that produced by the U-spring 37 and that produced in the arm 26 arising from a small bending action at the time the switch is operated.

It should also be noted that, when the switch is in the normal or closed circuit position, the fixed knife-edge bearing 38 is located a considerable distance above the center line A so that the U-spring 37 exerts a substantial upward force on the switch member 23 whereby the switch contacts are held firmly in the closed circuit position. As a result of this arrangement the contacts are not apt to be prematurely opened by vibration or jar. If the switch arm 26 were rigid as in the case of an ordinary toggle system, such a substantial offset of the fixed bearing member from the center line would not be practical because no snap action would occur until the switch member had opened far enough for the fixed bearing member 38 to pass over the center line A. The initial switch movement would therefore be slow and would result in destructive arcing. However, in our improved switch construction the action of the resilient arm 26 in storing energy causes the switch member 23 to snap from a stop position in which the bearing member 38 is considerably displaced from the center line of the U-spring whereby the advantage of a relatively high normal contact pressure is obtained without sacrificing the desired snap acting movement at a predetermined temperature.

It should also be noted that the thrust exerted on the resilient switch arm 26 in a longitudinal direction when it is in the upper or closed circuit position causes it to bow so that it becomes concave upwardly, as viewed in Fig. 2 of the drawing. Therefore, less rotative movement of the member 25 is required for snap action than would be required if the arm 26 were rigid, and the switch is therefore more sensitive in operation. Moreover, the bowing action of the switch arm 26 gives a greater movement of the movable switch member 23 and therefore a greater gap between the relatively movable contacts in the open circuit position for a given rotative movement of the operating member 25.

While we have shown and described particular embodiments of our invention, it will occur to those skilled in the art that various changes and modifications may be made without departing from our invention, and we therefore aim in the appended claims to cover all such changes and modifications as fall within the true spirit and scope of our invention.

What we claim as new and desire to secure by Letters Patent of the United States is:

1. In an over-temperature limit switch, a base, an L-shaped operating member mounted for rotation on said base, said member comprising a resilient arm and an actuating arm, a bimetallic element having a base portion mounted on said base and having a freely moving portion projecting from said base in juxtaposition with said actuating arm whereby said freely moving portion of said bimetallic element engages said actuating arm and rotates said member upon a predetermined deflection of said bimetallic element in response to temperature changes, a resilient over-center spring member engaging the free end of said resilient arm so as to exert a thrust on and thereby cause a deflection of said resilient arm, said resilient arm acting to store energy so that the free end of said resilient arm moves with a snap action at a predetermined temperature of said bimetallic element, and a switch comprising a stationary contact and a movable contact, said movable contact being carried on said resilient arm adjacent the free end thereof.

2. In a temperature responsive limit switch, a base member formed of good heat conducting material and adapted to be mounted in heat conducting relation with a device to be controlled, an L-shaped operating member mounted for rotation on said base member, said member comprising a resilient arm and an actuating arm, an L-shaped bimetallic element having a base portion mounted in thermal contact with said base member and a freely moving portion projecting from said base member in juxtaposition with said actuating arm whereby said freely moving portion of said bimetallic element engages said actuating arm and rotates said operating member upon a predetermined deflection thereof in response to temperature changes, adjustable means interposed between said actuating arm and said bimetallic element for varying the amount of free movement of said bimetallic element, a resilient over-center spring engaging the free end of said resilient arm so as to bias said member against rotative movement produced by said bimetallic element, said resilient arm acting to store energy so that the free end of said resilient arm moves with a snap action at a predetermined temperature of said bimetallic element, and a switch comprising a stationary contact and a cooperating movable contact, said movable contact being carried on said resilient arm adjacent the free end thereof.

3. In a thermostatic switch, a base member, an operating member mounted for rotation on said base member about a pivot point, said operating member comprising a pair of arms extending substantially radially from said pivot point, a bimetallic temperature responsive element mounted upon said base member and having a freely moving portion extending in juxtaposition with one of said arms whereby said bimetallic element engages said one arm and rotates said operating member at a predetermined temperature of said bimetallic element, adjustable means interposed between said one arm and said free end of said bimetallic element for adjusting the temperature at which said operating member is rotated by said bimetallic element, an over-center spring engaging the free end of the other of said arms so as to cause said operating member to move with a snap action, and switching means comprising a movable contact member carried on said other arm adjacent the free end thereof.

4. In a temperature responsive limit switch, a base, an operating member pivotally mounted on said base, said member comprising a switch arm and an actuating arm, a switch comprising a stationary contact and a cooperating movable contact, said movable contact being mounted on said switch arm, a temperature responsive element having a movable portion adapted to engage one side of said actuating arm and rotate said member in a direction to open said switch, a resilient reset arm mounted on said base member and extending in juxtaposition with the other side of said actuating arm, a cover mounted on said base member and cooperating therewith to form an enclosing casing, said cover having a slot therein and said resilient reset arm having an operating portion extending through said slot so that upon actuation of said operating portion said reset arm is deflected against said actuating arm and said lever is rotated in a direction to reclose said switch.

5. In an over-temperature limit switch, a base, a switch having an operating member mounted on said base, over-center spring means for biasing said member to open and closed circuit positions of said switch, a temperature responsive element for actuating said member to open said switch, a resilient reset arm for actuating said member to close said switch, a cover member mounted on said base member and cooperating therewith to form an enclosing casing, said cover member having a slot therein and said reset arm having a free end portion reversely bent so that a portion thereof projects through said slot and provides means for manually actuating said reset arm and reclosing said switch from the exterior of said cover member.

6. In a thermal switch, a base, a resilient switch member, means for pivotally mounting said switch member on said base, stop means defining two limiting positions of said switch member, over-center spring means mounted on said base and engaging the free end of said switch member so as to exert a thrust thereon for causing said switch member to move between said two limiting positions with a snap action, temperature responsive means for rotating said switch member in one direction, manually operated means for rotating said switch member in the opposite direction, and switch means comprising a movable contact carried on the free end of said switch member.

7. In a thermal limit switch, a base, a resilient switch member, means for pivotally mounting said switch member on said base, stop means defining two limiting positions of said switch member, over-center spring means mounted on said base and engaging the free end of said switch member so as to exert a thrust thereon for causing said switch member to move between said two limiting positions with a snap action, means for adjusting the thrust exerted by said spring means, temperature responsive means for rotating said switch member in one direction, manually operated means for rotating said switch member in the opposite direction, and switch means comprising a movable contact carried on the free end of said switch member.

8. In a thermal switch, a base, an operating member mounted for rotation on said base, said member comprising a resilient arm and an actuating arm, a temperature responsive element having a movable portion adapted to engage said actuating arm and rotate said member at a predetermined temperature, a resilient over-center spring member engaging the free end of said resilient arm so as to bias said oprating member against the rotative movement produced by said temperature responsive element, said resilient arm acting to store energy so that the free end of said resilient arm moves with a snap action at a predetermined temperature of said temperature responsive element, and a switch comprising a stationary contact and a movable contact, said movable contact being carried on said resilient arm adjacent the free end thereof.

RUSSELL A. WINBORNE.
RAYMOND L. COULTRIP.